Figure 1:
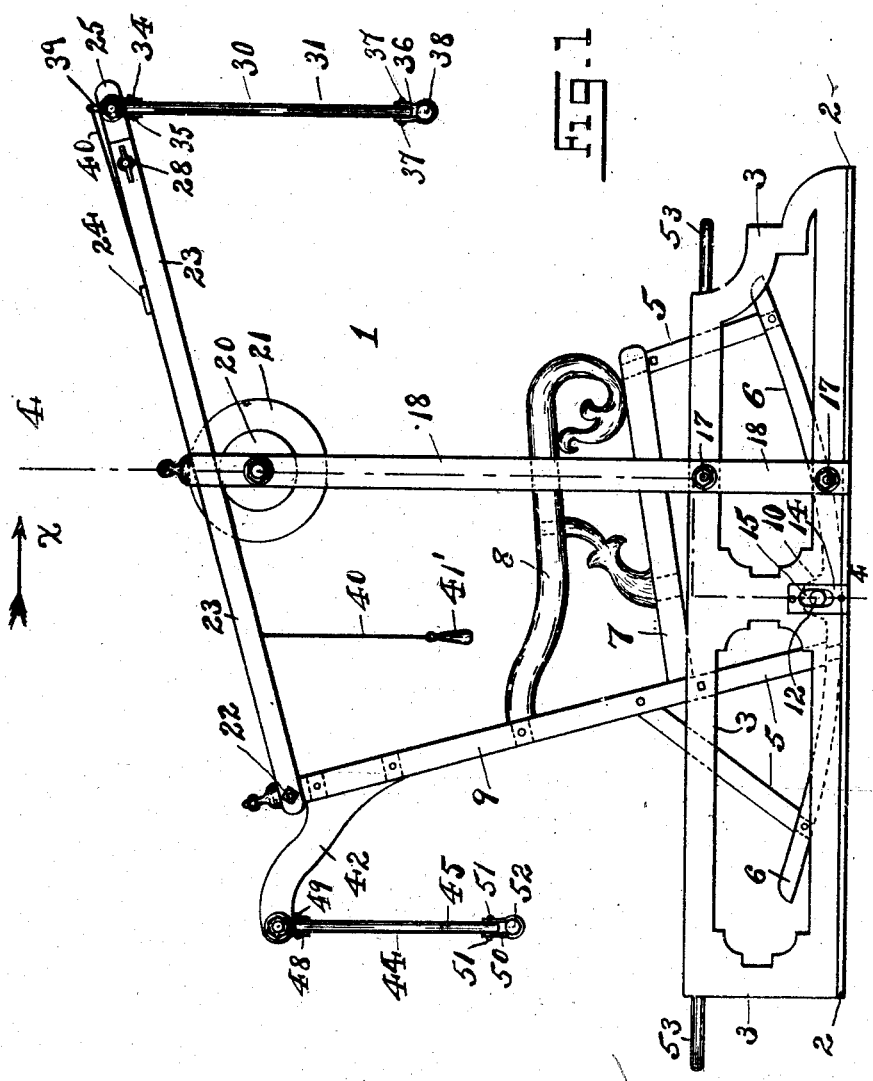

W. H. GARTZ.
SELF FANNING ROCKING CHAIR.
APPLICATION FILED AUG. 18, 1908.

905,686.

Patented Dec. 1, 1908.

5 SHEETS—SHEET 1.

WITNESSES:

INVENTOR
William H. Gartz,
BY
Fraenzel & Richards
ATTORNEYS

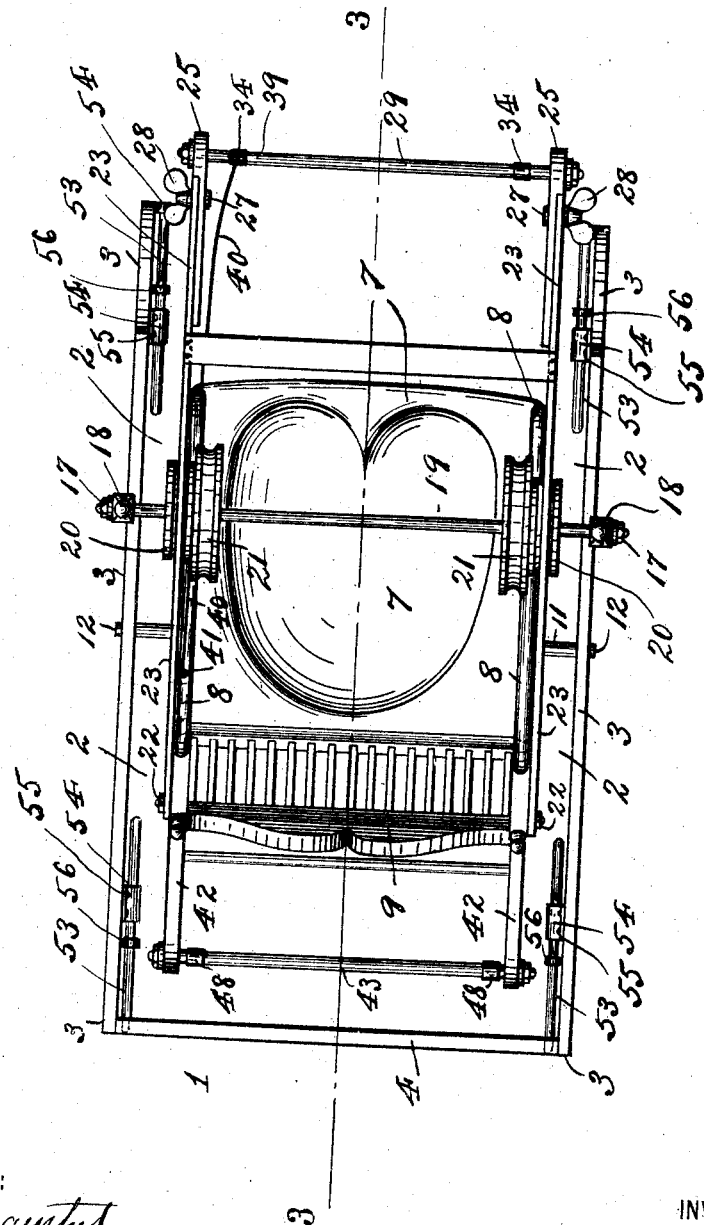

W. H. GARTZ.
SELF FANNING ROCKING CHAIR.
APPLICATION FILED AUG. 18, 1908.
905,686.
Patented Dec. 1, 1908.
5 SHEETS—SHEET 3.
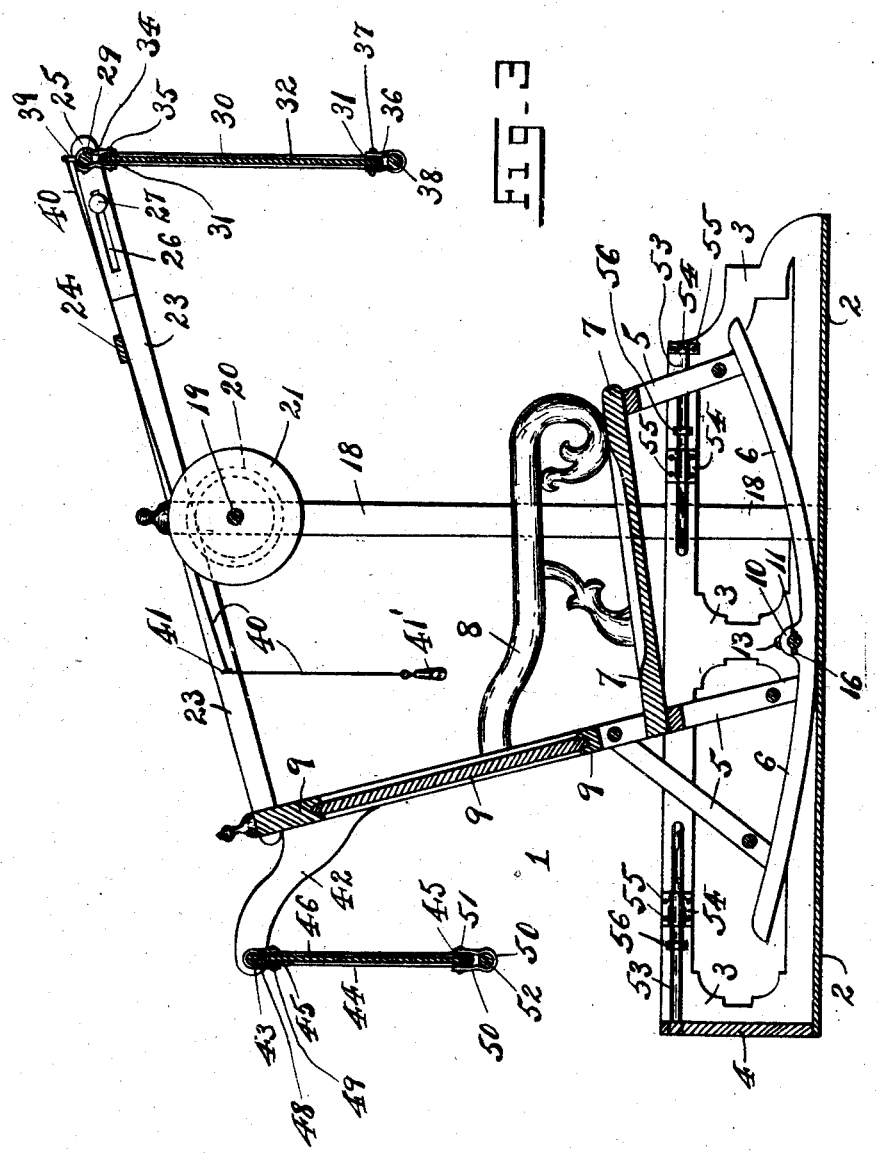
WITNESSES:
INVENTOR
William H. Gartz,
BY
ATTORNEYS

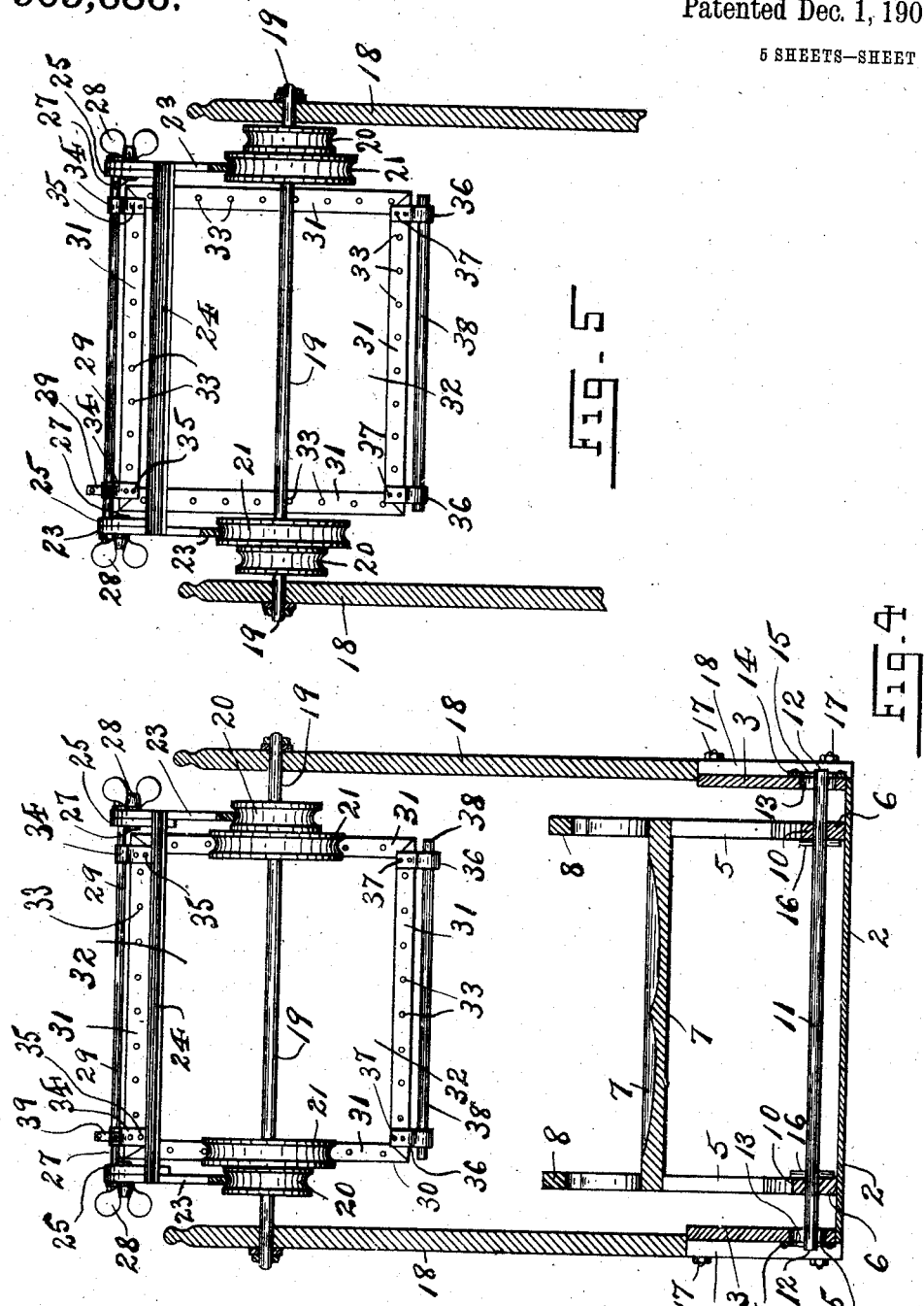

W. H. GARTZ.
SELF FANNING ROCKING CHAIR.
APPLICATION FILED AUG. 18, 1908.
905,686.
Patented Dec. 1, 1908.
5 SHEETS—SHEET 5.
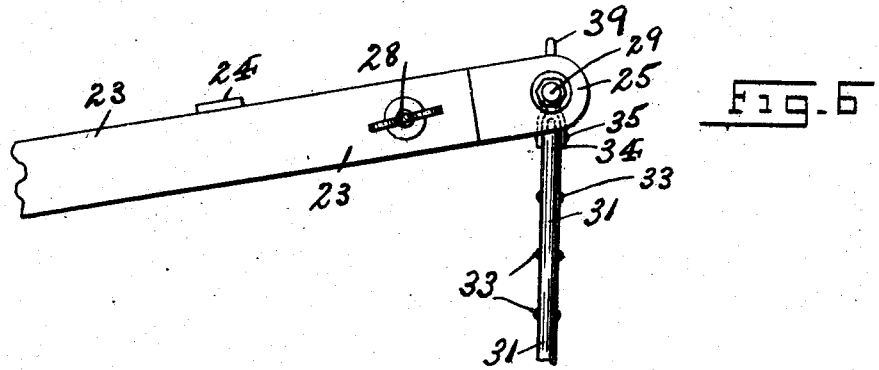
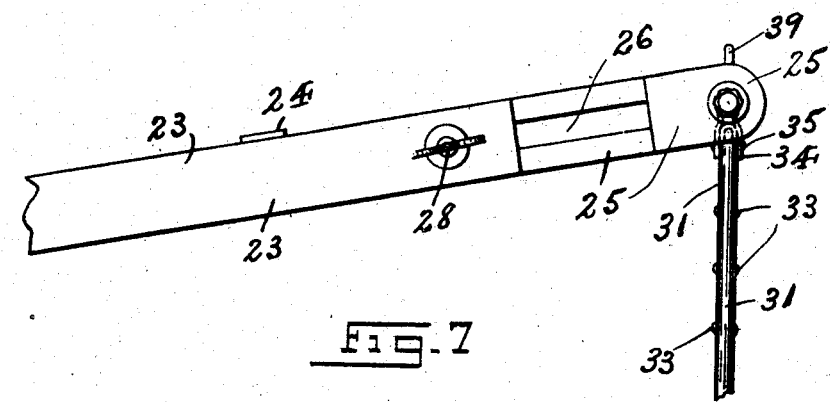
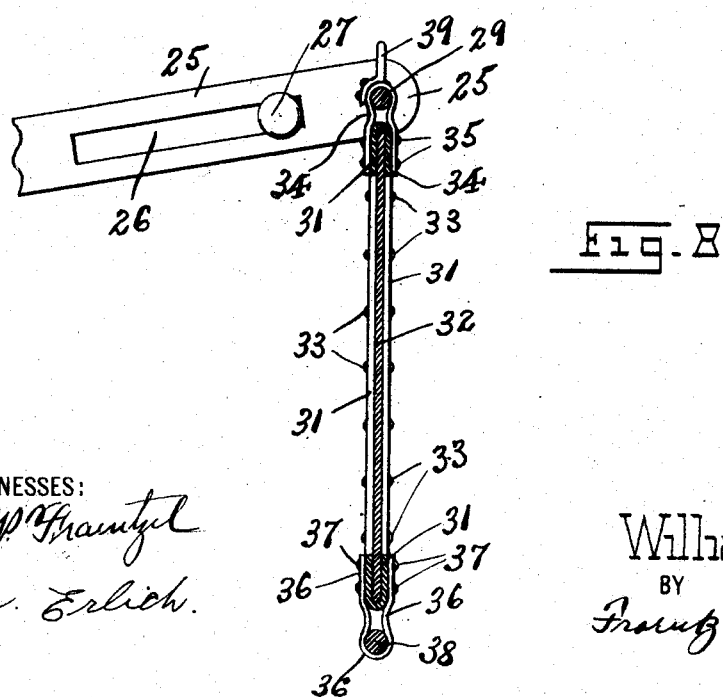
WITNESSES:
INVENTOR
William H. Gartz,
BY
ATTORNEYS

UNITED STATES PATENT OFFICE.

WILLIAM H. GARTZ, OF BERNARDSVILLE, NEW JERSEY, ASSIGNOR TO JAMES A. GARTZ, OF BERNARDSVILLE, NEW JERSEY.

SELF-FANNING ROCKING-CHAIR.

No. 905,686.　　　Specification of Letters Patent.　　　Patented Dec. 1, 1908.

Application filed August 18, 1908. Serial No. 449,039.

*To all whom it may concern:*

Be it known that I, WILLIAM H. GARTZ, a citizen of the United States, residing at Bernardsville, in the county of Somerset and State of New Jersey, have invented certain new and useful Improvements in Self-Fanning Rocking-Chairs; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention has reference, generally, to improvements in rocking-chairs, and the invention relates more particularly to a novel construction of rocking chair provided with an automatic or self-fanning apparatus, which when the chair is occupied the rocking action of said chair will operate the said fanning apparatus, thereby not only affording the occupant a comfortable and restful seat but also assuring the further comfort of cooling air currents, generated by said fanning apparatus. The fanning apparatus accomplishes a still further useful purpose in warding off annoying insects, such as flies, mosquitos and the like.

The present invention has for the principal object to provide a simple and durable rocking-chair equipped with automatic or self-fanning apparatus which is very simple and uncomplicated in its construction and operation, but very efficient in results; and a further object of the invention is to provide means whereby the chair can easily be removed from place to place, such as the interior or exterior of a house, as it may be desired.

Other objects of the present invention will be clearly understood from the following detailed description of the present invention.

With the various objects of the present invention in view the said invention consists in the novel self-fanning rocking-chair hereinafter set forth; and, furthermore, this invention consists in the various arrangements and combinations of parts, as well as in the details of the construction of the same, all of which will be more fully described in the following specification and then finally embodied in the clauses of the claim, which are appended to and which form an essential part of this specification.

The invention is clearly illustrated in the accompanying drawings, in which:—

Figure 1 is a side elevation of the novel construction of rocking-chair and self-fanning apparatus embodying the principles of the present invention. Fig. 2, is a plain view of the same. Fig. 3, is a longitudinal vertical section of the same taken on line 3—3 in said Fig. 2. Fig. 4, is a vertical cross section of the same taken on line 4—4 in said Fig. 1, and looking in the direction of the arrow X. Fig. 5, is a similar vertical cross section but illustrating an adjusted position of the fan elements. Fig. 6, is an enlarged detail side elevation of one end of the fan-supporting arms, illustrating the means for adjusting the length thereof; and Fig. 7 is a similar view showing the same adjusted to an extended position. Fig. 8, is an enlarged vertical cross section of the fan-member.

Similar characters of reference are employed in all of the above described views to indicate the corresponding parts.

Referring now to the said drawings, the reference character 1 indicates the complete rocking-chair equipped with the self-fanning apparatus, the same comprising a base member 2, extending along the side edges of which are fixed or secured a pair of side-members 3, of any ornamental configuration or design. Extending along the rear edge of said base-member 2, and fixed or secured thereto is the back-member 4, which also may be made of any desired configuration or design. Operatively arranged upon the said base-member 2, and between the side-members 3 thereof, is a rocking-chair the same comprising the usual or any desirable form of chair-frame 5, provided with the pair of rockers 6, the seat-portion 7, the arms 8, and the back-portion 9, all of which may be of any desirable construction or design. Each of said rockers 6, are provided with upwardly extending perforated lugs 10 which form bearings for a laterally extending rod 11. The ends 12 of this said rod 11 extend outwardly from each rocker 6, and pass through a vertical slot or opening 13, in each of said side-members 3. Secured upon the outer side of said side members 3 by means of screws or any other suitable fastening means, is a plate 14 provided with a vertical slot or opening 15 adapted to register with the said slot or opening 13 in said side-members 3. This said plate 14 prevents the ends 12 of said rod 11, from wearing away the slot 13, in the said side-members, which are preferably made of wood, when the said rod 11 rides up and down therein. Pins 16 passing through said rod 11 adjacent to said rockers 6 prevents any lateral movement or displacement of said rod 11. This said rod 11 serves to keep the rocker in proper operative relation with the base-member 2, preventing a shifting or displacement of the same when the chair is rocked by the occupant, and furthermore, thus assuring the proper operation of the self-fanning apparatus.

Extending upwardly from each side-member 3, and secured thereto by means of bolts and nuts 17 are posts 18. Extending laterally from post to post 18 and having its ends secured thereto near the upper or free ends of said posts 18, is a fixed shaft or rod 19. Slidably arranged upon said shaft or rod 19 and adapted to revolve thereon are a pair of grooved wheels or pulleys 20. Also slidably arranged upon said shaft or rod 19 and adapted to revolve thereon are another pair of grooved wheels or pulleys 21 of larger diameter. Pivotally secured to the upper free end of the said chair-back 9, by means of bolts 22 are outwardly extending arms 23. These said arms are adapted to ride upon either one or the other of said pair of wheels or pulleys 20 or 21. The said arms 23 are connected together by means of the cross-bar or brace 24 which is secured to said arms 23 by means of screws, or any other suitable fastening means. Slidably secured upon the free-end of each of said outwardly extending arms 23 is an adjustable extension 25 provided with an elongated opening or slot 26, a bolt 27, provided with a head which engages with the edges of said slot or opening 26, passes through said slot and through the free end of said outwardly extending arm 23, a thumb-nut 28 engages with the free end of said bolt 27 and serves to bind the said arms 23 and said extensions 25 together in any position to which they may be adjusted, as will be clearly evident from an inspection of Figs. 6 and 7 of the said drawings. Pivotally secured to a rod 29, which is fixed to and which extends laterally between the free ends of said extensions 25, is a fan-member 30, the same comprising, preferably, a frame-portion 31, of metal or any other desirable material, and a fan-body 32 of any desirable material. The said fan-body 32, is stretched upon and secured to said frame portion 31 by rivets 33, or any other suitable means. The pivotal connection between said rod 29 and said fan-member 30 comprises a pair of yoke or link-pieces 34, which form a suspending loop around said rod 29, and the free ends of which are secured to said frame-portion 31 by means of rivets 35 or any other desirable means, secured to the bottom-edge of said fan-member 30 by means of a pair of yoke or link pieces 36, secured to the frame portion 31 of said fan-member 30 by means of rivets 37 or the like, is a weight-member 38.

As it is sometimes desirable to operate the fan-member 30 without rocking the chair, a means to accomplish this result is provided, said means comprising a lug 39 secured to one of said yoke or link-pieces 34, in any suitable manner, a pull cord or chain 40 secured to the free end of said lug 39 and passing along side of one of said outwardly extending arms 23 through an eyelet 41 fixed thereto, and having on the free end of said pull-cord or chain 40 a handle 41' in such a position as to be within easy reach of the occupant of the chair. By pulling upon this pull-cord or chain 40 the fan-member 30 is caused to oscillate or swing in the desired manner to produce the cooling currents of air. Secured to the back-portion 9 of said rocking-chair in any suitable manner, are a pair of backwardly extending arms 42. Secured to the free-ends of said arms 42 and extending laterally between the same is a rod 43. Suspended upon this rod 43 so as to oscillate or swing thereon is a fan-member 44, comprising, preferably, a frame-portion 45, of metal or any other desirable material and a fan-body 46 of any desirable material. The said fan-body 46 is stretched upon and secured to said frame-portion 45 by rivets 47, or any other suitable means. The pivotal connection between the said rod 43 and said fan member 44, comprises a pair of yoke or link pieces 48, which form a suspending loop around said rod 43, and the free ends of which are secured to said frame portion 45 by means of rivets 49, or any other desirable means. Secured to the bottom-edge of said fan-member 44 by means of a pair of yoke or link pieces 50, secured to said frame portion 45 by means of rivets 51, or the like, is a weight member 52.

As it may be desirable to move the rocking chair and its self-fanning apparatus, from place to place, I have provided means for so doing comprising a set of lifting handles 53. These handles 53 are slidably arranged upon the side-members 3 within bearings 54, secured to said side-members 3 by means of screws or the like 55. When not in use the said handles 53 are designed to be pushed in out of the way, as illustrated more particularly in Fig. 2 of the said drawings. When it is desired to lift the said chair, the handles 53 are pulled out, their outward movement being limited by the shoulder 56, and the chair may then be easily lifted and carried from place to place.

Having thus described the separate parts and devices comprising the novel rocking chair and self-fanning apparatus embodying the present invention, the same operates as follows:—When the occupant sits in the chair and begins to rock the motion of the rocking chair is imparted to the outwardly extending arms 23 and the backwardly extending arms 42, this motion in turn is transmitted to the fan-members 30 and 44, which are caused to swing on their respective rods 29 and 43. The swinging or oscillating movement of said fan-members 30 and 44 being accelerated and controlled by the action of the respective weights 38 and 52, in a manner clearly to be understood from an inspection of the accompanying drawings. As it is sometimes desired to raise the elevation of the fan-members 30 the same is accomplished by lifting the outwardly extending arms 23 from their contact with the wheels or pulleys 20, sliding the said wheels or pulleys 20 upon the rod 19 to one side, and then sliding the said wheels or pulleys 21, which are of larger diameter, beneath the said arms 23 so that the latter may rest or ride upon the said wheels or pulleys 21, thus elevating the fan-member 30 at the end of said arms 23, all of which will be clearly evident from an inspection of Figs. 4 and 5 of the accompanying drawings.

It will be clearly understood that some changes may be made in the various arrangements and combinations of the devices and their parts, as well as in the details of the construction thereof without departing from the scope of my present invention. Hence, I do not limit my invention to the exact arrangements and combinations of the devices and their parts as described in the foregoing specification and as illustrated in the accompanying drawings; nor do I confine myself to the exact details of the construction of the said parts.

I claim.

1. In a rocking-chair, the combination with a base-member of a rocking-chair, means for operatively connecting said rocking-chair with said base-member, a pair of outwardly extending arms pivotally connected with the back of said rocking-chair, means for operatively supporting said outwardly extending arms, a swinging fan-member pivotally connected with the said outwardly extending arms, adapted to be operated by the movement of said rocking-chair, a pair of backwardly extending arms secured upon the back of said rocking-chair, a fan-member pivotally connected with the said backwardly extending arms, adapted to be operated by the movement of said rocking-chair, substantially as and for the purposes above set forth.

2. In a rocking-chair, the combination with a base-member of a pair of side-members each provided with a vertical slot or opening, a rocking-chair arranged upon said base-member a rod connected with the rockers of said rocking-chair, the free-ends of said rod being adapted to pass through and engage with said vertical slots or openings of said side-members, a pair of outwardly extending arms pivotally connected with the back of said rocking chair, means for operatively supporting said outwardly extending arms, a swinging fan-member pivotally connected with said outwardly extending arms, adapted to be operated by the movement of said rocking-chair, substantially as and for the purposes above set forth.

3. In a rocking-chair, the combination with a base-member of a pair of side-members each provided with a vertical slot or opening, a rocking-chair arranged upon said base-member a rod connected with the rockers of said rocking-chair, the free-ends of said rod being adapted to pass through and engage with said vertical slots or openings of said side-members, a pair of outwardly extending arms pivotally connected with the back of said rocking-chair, means for operatively supporting said outwardly extending arms, a swinging fan-member pivotally connected with said outwardly extending arms, adapted to be operated by the movement of said rocking-chair a pair of backwardly extending arms secured upon the back of said rocking chair, a fan-member pivotally connected with the said backwardly extending arms, adapted to be operated by the movement of said rocking-chair, substantially as and for the purposes above set forth.

4. In a rocking-chair, the combination with a base-member of a pair of side-members each provided with a vertical slot or opening, a rocking-chair arranged upon said base-member, a rod connected with the rockers of said rocking-chair, the free-ends of said rod being adapted to pass through and engage with said vertical slots or openings of said side-members, posts connected with said side-members, a rod or shaft connected with and extending laterally between said posts, one or more pairs of pulleys or wheels slidably arranged on said rod or shaft, a pair of outwardly extending arms pivotally connected with the back of said rocking-chair, said outwardly extending arms being adapted to ride upon a pair of said pulleys or wheels, a swinging fan-member pivotally connected with said outwardly extending arms, adapted to be operated by the movement of said rocking chair, substantially as and for the purposes above set forth.

5. In a rocking-chair, the combination with a base-member of a pair of side-members each provided with a vertical slot or opening, a rocking-chair arranged upon said base-member, a rod connected with the rockers of said rocking-chair, the free-ends of said rod being adapted to pass through and engage with said vertical slots or openings, of said side members, posts connected with said side-members, a rod or shaft connected with and extending laterally between said posts, one or more pairs of pulleys or wheels slidably arranged on said rod or shaft, a pair of outwardly extending arms pivotally connected with the back of said rocking-chair, said outwardly extending arms being adapted to ride upon a pair of said pulleys or wheels, a swinging fan-member pivotally connected with said outwardly extending arms, adapted to be operated by the movement of said rocking-chair, a pair of backwardly extending arms, secured upon the back of said rocking-chair, a fan-member pivotally connected with the said backwardly extending arms, adapted to be operated by the movement of said rocking-chair, substantially as and for the purposes above set forth.

6. In a rocking-chair, the combination with a base member of a pair of side-members each provided with a vertical slot or opening, a rocking-chair arranged upon said base-member, a rod connected with the rockers of said rocking-chair, the free-ends of said rod being adapted to pass through and engage with said vertical slots or openings of said side-members, posts connected with said side-members, a rod or shaft connected with and extending laterally between said posts, one or more pairs of pulleys or wheels slidably arranged on said rod or shaft, a pair of outwardly extending arms pivotally connected with the back of said rocking-chair, said outwardly extending arms being adapted to ride upon a pair of said pulleys or wheels, extension-members slidably secured to the free ends of said outwardly extending arms, means for locking said extension-members in any adjusted position, a rod connected with and extending laterally between the free ends of said extension-members, a swinging fan-member pivotally secured upon said rod, adapted to be operated by the movement of said rocking chair, substantially as and for the purposes above set forth.

7. In a rocking-chair, the combination with a base member of a pair of side-members each provided with a vertical slot or opening, a rocking-chair arranged upon said base-member, a rod connected with the rockers of said-rocking chair, the free-ends of said rod being adapted to pass through and engage with said vertical slots or openings of said side-members, posts connected with said side-members, a rod or shaft connected with and extending laterally between said posts, one or more pairs of pulleys or wheels slidably arranged on said rod or shaft, a pair of outwardly extending arms pivotally connected with the back of said rocking-chair, said outwardly extending arms being adapted to ride upon a pair of said pulleys or wheels, extension-members slidably secured to the free-ends of said outwardly extending arms, means for locking said extension members in any adjusted position, a rod connected with and extending laterally between the free-ends of said extension-members, a swinging fan-member pivotally secured upon said rod, adapted to be operated by the movement of said rocking-chair, a pair of backwardly extending arms secured upon the back of said rocking-chair, a rod connected with and extending laterally between the free ends of said backwardly extending arms, a swinging fan member pivotally secured upon said rod, adapted to be operated by the movement of said rocking-chair, substantially as and for the purposes above set forth.

8. In a rocking-chair, the combination with a base member of a pair of side-members each provided with a vertical slot or opening, a rocking-chair arranged upon said base-member, a rod connected with the rockers of said rocking-chair, the free ends of said rod being adapted to pass through and engage with said vertical slots or openings of said side-members, posts connected with said side-members, a rod or shaft connected with and extending laterally between said posts, one or more pairs of pulleys or wheels slidably arranged on said rod or shaft, a pair of outwardly extending arms pivotally connected with the back of said rocking-chair, said outwardly extending arms being adapted to ride upon a pair of said pulleys or wheels, extension-members slidably secured to the free ends of said outwardly extending arms, means for locking said extension-members in any adjusted position, a rod connected with and extending laterally between the free ends of said extension-members, a swinging fan-member pivotally secured upon said rod, said swinging fan-member comprising a frame-portion, a pair of yoke or link-pieces secured to said frame-portion and pivotally connected with said rod, a fan-body stretched upon and secured to said frame-portion, a weight-member secured to the lower end of said frame-portion, substantially as and for the purposes above set forth.

9. In a rocking-chair, the combination with a base-member of a pair of side-members each provided with a vertical slot or opening, a rocking-chair arranged upon said base-member, a rod connected with the rockers of said rocking-chair, the free ends of said rod being adapted to pass through and engage with said vertical slots or openings of said side-members, posts connected with said side-members, a rod or shaft connected with and extending laterally between said posts, one or more pairs of pulleys or wheels slidably arranged on said rod or shaft, a pair of outwardly extending arms pivotally connected with the back of said rocking-chair, said outwardly extending arms being adapted to ride upon a pair of said pulleys or wheels, extension-members slidably secured to the free ends of said outwardly extending arms, means for locking said extension-members in any adjusted position, a rod connected with and extending laterally between the free ends of said extension-members, a swinging fan-member pivotally secured upon said rod, said swinging fan-member comprising a frame-portion, a pair of yoke or link-pieces secured to said frame-portion and pivotally connected with said rod, a fan-body stretched upon and secured to said frame-portion, a weight-member secured to the lower end of said frame-portion, means for operating said fan-member by hand, comprising a lug secured to one of said yoke or link-pieces, a pull cord secured to the free-end of said lug, an eyelet secured to one of said outwardly extending arms through which said pull cord passes, and a handle secured to the free-end of said pull-cord, substantially as and for the purposes above set forth.

10. In a rocking-chair, the combination with a base member of a pair of side-members each provided with a vertical slot or opening, a rocking-chair arranged upon said base-member, a rod connected with the rockers of said rocking-chair, the free ends of said rod being adapted to pass through and engage with said vertical slots or openings of said side-members, posts connected with said side-members, a rod or shaft connected with and extending laterally between said posts, one or more pairs of pulleys or wheels slidably arranged on said rod or shaft, a pair of outwardly extending arms pivotally connected with the back of said rocking-chair, said outwardly extending arms being adapted to ride upon a pair of said pulleys or wheels, extension-members slidably secured to the free ends of said outwardly extending arms, means for locking said extension-members in any adjusted position, a rod connected with and extending laterally between the free ends of said extension-members, a swinging fan-member pivotally secured upon said rod, said swinging fan-member comprising a frame-portion, a pair of yoke or link-pieces secured to said frame-portion and pivotally connected with said rod, a fan-body stretched upon and secured to said frame-portion, a weight-member secured to the lower end of said frame-portion a pair of backwardly extending arms secured upon the back of said rocking-chair, a rod connected with and extending laterally between the free-ends of said backwardly extending arms, a swinging fan-member pivotally secured upon said rod, said swinging fan-member comprising a frame-portion, a pair of yoke or link-pieces secured to said frame portion and pivotally connected with said rod, a fan-body stretched upon and secured to said frame-portion, a weight-member secured to the lower end of said frame-portion, substantially as and for the purposes above set forth.

11. In a rocking-chair, the combination with a base member of a pair of side-members each provided with a vertical slot or opening, a rocking-chair arranged upon said base-member, a rod connected with the rockers of said rocking-chair, the free ends of said rod being adapted to pass through and engage with said vertical slots or openings of said side-members, posts connected with said side-members, a rod or shaft connected with and extending laterally between said posts, one or more pairs of pulleys or wheels slidably arranged on said rod or shaft, a pair of outwardly extending arms pivotally connected with the back of said rocking-chair, said outwardly extending arms being adapted to ride upon a pair of said pulleys or wheels, extension-members slidably secured to the free ends of said outwardly extending arms, means for locking said extension-members in any adjusted position, a rod connected with and extending laterally between the free ends of said extension-members, a swinging fan member pivotally secured upon said rod, said swinging fan-member comprising a frame-portion, a pair of yoke or link-pieces secured to said frame-portion and pivotally connected with said rod, a fan-body stretched upon and secured to said frame-portion, a weight-member secured to the lower end of said frame-portion, means for operating said fan-member by hand, comprising a lug secured to one of said yoke or link-pieces, a pull-cord secured to the free-end of said lug, an eyelet secured to one of said outwardly extending arms through which said pull cord passes, and a handle secured to the free-end of said pull cord, a pair of backwardly extending arms secured upon the back of said rocking-chair, a rod connected with and extending laterally between the free-ends of said backwardly extending arms, a swinging fan-member pivotally secured upon said rod, said swinging fan-member comprising a frame-portion, a pair of yoke or link-pieces secured to said frame-portion and pivotally connected with said rod, a fan-body stretched upon and secured to said frame portion, a weight-member secured to the lower end of said frame-portion, substantially as and for the purposes above set forth.

12. In a rocking-chair, the combination with a base-member of a rocking-chair, means for operatively connecting said rocking-chair with said base-member, a pair of outwardly extending arms pivotally connected with the back of said rocking-chair, means for operatively supporting said outwardly extending arms, a swinging fan-member pivotally connected with the said outwardly extending arms, adapted to be operated by the movement of said rocking-chair, a pair of backwardly extending arms secured upon the back of said rocking-chair, a fan-member pivotally connected with the said backwardly extending arms, adapted to be operated by the movement of said rocking-chair, and a set of lifting-handles connected with said base-member, substantially as and for the purposes above set forth.

13. In a rocking-chair, the combination with a base member of a pair of side-members each provided with a vertical slot or opening, a rocking-chair arranged upon said base-member a rod connected with the rockers of said rocking-chair, the free-ends of said rod being adapted to pass through and engage with said vertical slots or openings of said side-members, a pair of outwardly extending arms pivotally connected with the back of said rocking-chair, means for operatively supporting said outwardly extending arms, a swinging fan-member pivotally connected with said outwardly extending arms, adapted to be operated by the movement of said rocking-chair, a pair of backwardly extending arms, secured upon the back of said rocking-chair, a fan-member pivotally connected with the said backwardly extending arms, adapted to be operated by the movement of said rocking-chair, and a set of lifting handles slidably connected with said side-members, substantially as and for the purposes above set forth.

14. In a rocking-chair, the combination with a base member of a pair of side-members each provided with a vertical slot or opening, a rocking-chair arranged upon said base-member, a rod connected with the rockers of said rocking-chair, the free ends of said rod being adapted to pass through and engage with said vertical slots or openings of said side-members, posts connected with said side-members, a rod or shaft connected with and extending laterally between said posts, one or more pairs of pulleys or wheels slidably arranged on said rod or shaft, a pair of outwardly extending arms pivotally connected with the back of said rocking-chair, said outwardly extending arms being adapted to ride upon a pair of said pulleys or wheels, extension-members slidably secured to the free ends of said outwardly extending arms, means for locking said extension-members in any adjusted position, a rod connected with and extending laterally between the free-ends of said extension-members, a swinging fan-member pivotally secured upon said rod, said swinging fan-member comprising a frame-portion, a pair of yoke or link-pieces secured to said frame-portion and pivotally connected with said rod, a fan-body stretched upon and secured to said frame-portion, a weight-member secured to the lower end of said frame-portion, means for operating said fan-member by hand, comprising a lug secured to one of said yoke or link-pieces, a pull-cord secured to the free-end of said lug, an eyelet secured to one of said outwardly extending arms through which said pull-cord passes, and a handle secured to the free-end of said pull-cord, and a set of lifting-handles slidably connected with said side-members, substantially as and for the purposes above set forth.

15. In a rocking-chair, the combination with a base-member of a pair of side-members each provided with a vertical slot or opening, a rocking-chair arranged upon said base-members, a rod connected with the rockers of said rocking-chair, the free ends of said rod being adapted to pass through and engage with said vertical slots or openings of said side-members, posts connected with said side-members, a rod or shaft connected with and extending laterally between said posts, one or more pairs of pulleys or wheels slidably arranged on said rod or shaft, a pair of outwardly extending arms pivotally connected with the back of said rocking-chair, said outwardly extending arms being adapted to ride upon a pair of said pulleys or wheels, extension-members slidably secured to the free-ends of said outwardly extending arms, means for locking said extension-members in any adjusted position, a rod connected with and extending laterally between the free ends of said extension-members, a swinging fan member pivotally secured upon said rod, said swinging fan-member comprising a frame-portion, a pair of yoke or link-pieces secured to said frame-portion and pivotally connected with said rod, a fan-body stretched upon and secured to said frame-portion, a weight-member secured to the lower end of said frame-portion, means for operating said fan-member by hand, comprising a lug secured to one of said yoke or link-pieces, a pull-cord secured to the free-end of said lug, an eyelet secured to one of said outwardly extending arms through which said pull cord passes, and a handle secured to the free-end of said pull-cord, a pair of backwardly extending arms secured upon the back of said rocking-chair, a rod connected with and extending laterally between the free-ends of said backwardly extending arms, a swinging fan-member pivotally secured upon said rod, said swinging fan-member comprising a frame-portion, a pair of yoke or link-pieces secured to said frame-portion and pivotally connected with said rod, a fan-body stretched upon and secured to said frame portion, a weight-member secured to the lower end of said frame-portion, and a set of lifting-handles slidably connected with said side-members, substantially as and for the purposes above set forth.

In testimony, that I claim the invention set forth above I have hereunto set my hand this 17th day of August, 1908.

WILLIAM H. GARTZ.

Witnesses:
F. H. W. FRAENTZEL,
ANNA H. ALTER.